Oct. 30, 1962    K. RITTER ETAL    3,061,032
HYDRAULIC INSTALLATION FOR VEHICLES
SUCH AS TRACTORS AND THE LIKE
Filed Sept. 23, 1957    6 Sheets-Sheet 5

INVENTORS
Kaspar Ritter and
Wolfgang Ritter
BY Michael S. Striker
Attorney

FIG. 10

United States Patent Office 3,061,032
Patented Oct. 30, 1962

3,061,032
HYDRAULIC INSTALLATION FOR VEHICLES SUCH AS TRACTORS AND THE LIKE
Kaspar Ritter, Kirchheim, Teck, and Wolfgang Hütter, Bezgenrieth, Wurttemberg, Germany, assignors to Allgaier-Werke G.m.b.H., Uhingen, Wurttemberg, Germany
Filed Sept. 23, 1957, Ser. No. 685,548
Claims priority, application Germany Mar. 29, 1957
9 Claims. (Cl. 180—53)

The present invention relates to hydraulic installations.

More particularly, the present invention relates to hydraulic installations for use with vehicles such as tractors or the like where auxiliary devices such as devices for carrying out agricultural operations are carried by the vehicle and are required to be driven therefrom.

One of the objects of the present invention is to provide on a vehicle of the above type, which has an infinitely adjustable fluid drive providing a drive to the wheels of the vehicle, a hydraulic installation capable of operating a hydraulic auxiliary device of the above type as well as the fluid drive.

Another object of the present invention is to provide a hydraulic installation capable of operating an auxiliary device which requires liquid at relatively high pressure as well as a fluid drive which requires liquid at a pressure much lower than that required for the auxiliary device.

A further object of the present invention is to provide a hydraulic installation which is capable of operating the brakes of a vehicle such as a tractor or the like and one or more trailers connected thereto.

An additional object of the present invention is to provide structure capable of accomplishing the above objects and composed of simple and ruggedly constructed elements which are reliable in operation.

With the above objects in view the present invention mainly consists of a hydraulic installation for vehicles such as tractors and the like, this installation including a pressure pump means adapted to be driven by the engine of the vehicle for pumping liquid at a relatively high pressure. A hydraulic auxiliary device requiring a relatively high liquid pressure communicates with the pump means to receive liquid therefrom. A return flow conduit communicates with the auxiliary device for returning liquid therefrom to a reservoir from which the liquid is withdrawn by the pump means. A fluid drive for driving the vehicle communicates with the return flow conduit to receive liquid therefrom, and a means cooperates with the return flow conduit for maintaining the liquid in the latter at a pressure great enough for operation of the fluid drive.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
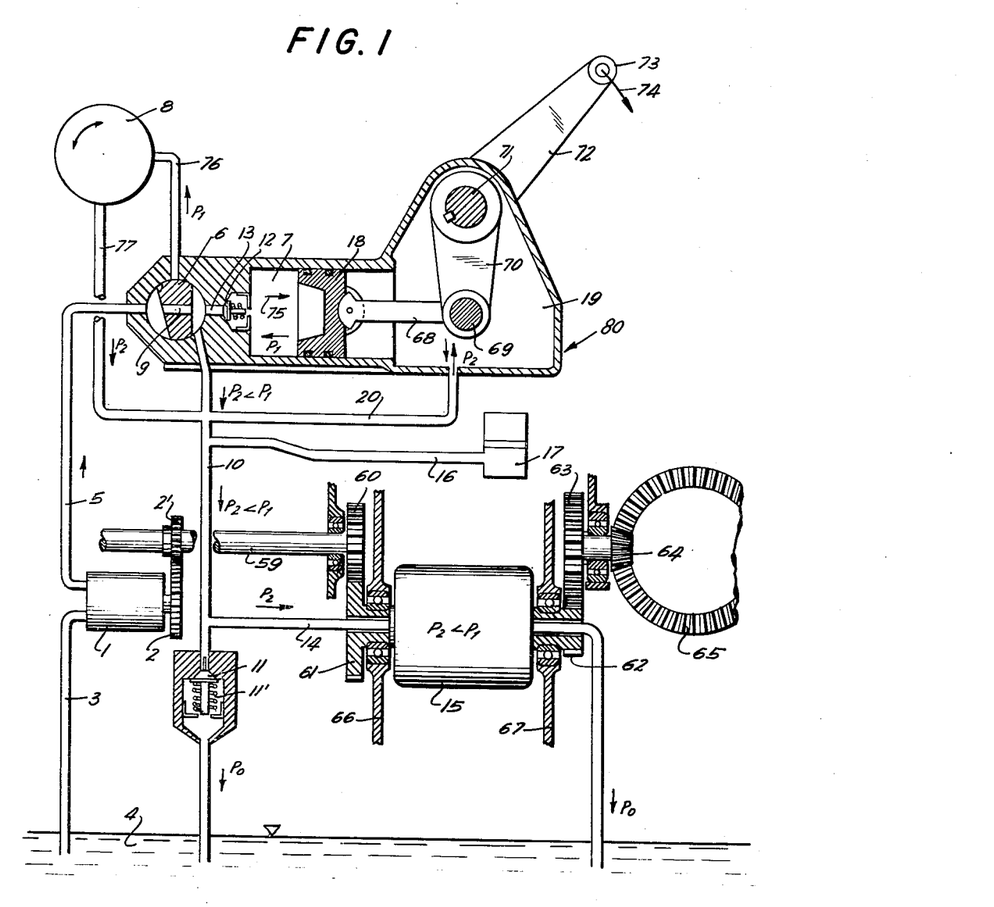
FIG. 1 is a schematic illustration of a hydraulic installation according to the present invention.

FIG. 1 schematically illustrates a pump 1 carried by the vehicle which is in the form of a tractor or the like, and the pump 1 is adapted to discharge a liquid such as oil at a relatively high pressure. The pump 1 is driven by a gear 2 which meshes with a gear 2′ fixedly carried by a shaft 59 which is driven by the unillustrated engine of the vehicle. The output of the vehicle engine is delivered through the shaft 59 not only to the pressure pump means 1, but also to the fluid drive 15 which is an infinitely controllable hydrostatic transmission of a known construction such as that shown in U.S. Patent No. 2,687,049, through the gears 60 and 61. The fluid drive acts as a torque converter and drives the gear 62 which meshes with a gear 63 fixed coaxially with a bevel gear 64 which in turn drives a bevel gear 65 connected through suitable transmission means with the drive wheels of the vehicle. Part of the vehicle is shown in the form of the walls 66 and 67 which carry the bearings for the fluid drive 15.

The pressure pump 1 sucks a hydraulic fluid such as oil or the like from a reservoir 4 through a suction conduit 3, and the liquid is discharged at a relatively high pressure $P_1$ along the pressure conduit 5. As may be seen from FIG. 1, the pressure conduit 5 leads to a control valve means 6 which forms part of an auxiliary device 80 which is hydraulic and which is used to operate any suitable implements carried by the tractor or the like, such as a plowing device, a harrowing device, a sowing device, or the like. The hydraulic auxiliary device 80 which includes the valve 6 also includes the cylinder 7 in which the piston 18 is slidable. The piston 18 is connected pivotally by a suitable wrist-pin connection or the like with a connecting rod 68 which is pivotally connected at its end distant from the piston 18 by a pivot pin 69 with a lever 70 fixed to a shaft 71 which is supported for rotation about its axis by the housing communicating with the right end of the cylinder 7, as viewed in FIG. 1. At the exterior of this housing the shaft 71 is fixed with a lever 72 which is pivotally connected at 73 with the device which is controlled by the hydraulic auxiliary device 80 shown in FIG. 1, and this device which is controlled exerts on the lever 72 a force acting in the direction of arrow 74 of FIG. 1 so that the device carried by the tractor or the like always urges the piston 18 to the left, as viewed in FIG. 1. In order to overcome the force 74 the pressure $P_1$ provided by the pump must be, for example, on the order of 50 atmospheres.

Figure 2:
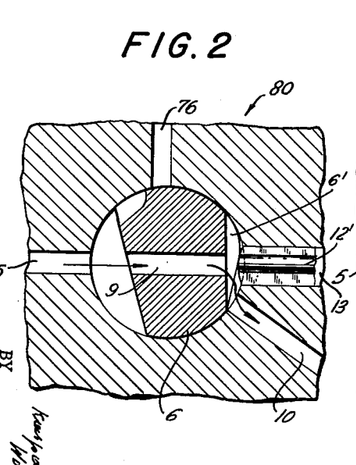
FIGS. 2–4 respectively show three different positions of a control valve of the structure of FIG. 1.

When the valve 6 is in the neutral position thereof shown in FIGS. 1 and 2, the high pressure fluid from the pressure conduit 5 can flow through the central bore 9 of the valve 6 to the return flow conduit 10 which returns the hydraulic fluid to the reservoir 4. Liquid which is in the cylinder 7 at the left side of the piston 18, as viewed in FIG. 1, is prevented from flowing back to the return flow conduit 10 by a non-return valve 12 located in a passage 13 at the left end of the cylinder 7, as viewed in FIG. 1. Thus, at this time the valve 12, because it is automatically maintained in its closed position, will prevent the fluid from shifting the piston 18 further to the left, as viewed in FIG. 1, irrespective of the magnitude of the force 74.

In order to permit the lever 72 to turn in a clockwise direction, as viewed in FIG. 1, the valve 6 may be turned in a clockwise direction through a relatively small angle from its neutral position shown in FIG. 2, so that a cam portion 6' of the valve 6 will engage the left end of the valve stem 12' of the valve 12 and will shift the valve 12 to the right, as viewed in FIG. 1, against the force of the spring acting thereon and will thus move the valve 12 to an open position in which the liquid in the cylinder 7 at the left-hand side of the piston 18 can flow from the cylinder 7 to the return flow conduit 10, and in this way the shaft 71 may turn in a clockwise direction, as viewed in FIG. 1.

It will be noted that the fluid drive 15 communicates through a conduit 14 with the return flow conduit 10, and downstream of the connection between conduits 10 and 14 the conduit 10 is provided with a means for maintaining in the conduit 10 upstream of this means a pressure great enough to assure proper operation of the fluid drive. This means takes the form of a pressure relief valve 11 provided with a loading spring 11' so that upstream of the pressure relief valve 11 the conduit 10 will always have a predetermined relatively low pressure $P_2$ which may be, for example, on the order of 5 atmospheres. The fluid drive 15 is in the form of a pump and motor which operate at a very high pressure on the order of 100 atmospheres, and because of unavoidable leaks of the fluid between the moving parts of the fluid drive it is necessary to continuously replace fluid escaping from the fluid drive and flowing back to the reservoir 4, and this fluid is replaced at a relatively low pressure, which may be on the order of 5 atmospheres, for example, through the conduit 14.

Figure 3:
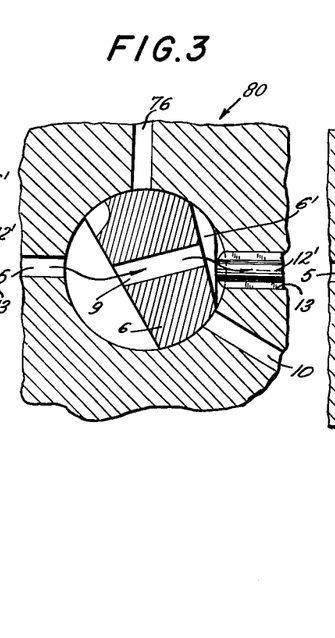

By turning the valve 6 in a counterclockwise direction from the neutral position thereof shown in FIG. 2 to the position shown in FIG. 3, the communication between the pressure conduit 5 and return flow conduit 10 is cut off and the hydraulic fluid at the necessary high pressure flows through the valve 12 into the cylinder 7 so as to displace the piston 18 in the direction of arrow 75 of FIG. 1, the pressure fluid itself raising the valve 12 away from its valve seat. It will be noted that the chamber 19 at the right-hand side of the piston 18, as viewed in FIG. 1, communicates through the conduit 20 with the return flow conduit 10, so that while the piston 18 performs its working stroke in a direction to the right, as viewed in FIG. 1, fluid is discharged from the chamber 19 through the conduit 20 back to the return flow conduit 10. The chamber 19 is always filled with the hydraulic fluid medium. When the piston 18 moves to the right so as to decrease the volume of the chamber 19 the latter will remain filled with the hydraulic fluid since the pressure maintained in the conduits 10 and 20 upstream of the valve 11 guarantees that the fluid cannot move out of the chamber 19 at a rate faster than it is advanced out of this chamber by the movement of the piston 18 to the right. On the other hand, when the piston 18 moves to the left so as to increase the volume of the chamber 19 then as a result of the pressure maintained in the conduits 10 and 20 upstream of the valve 11 the hydraulic fluid medium will immediately enter into the chamber 19 and keep the latter filled while its volume increases. Of course, this increasing volume of the chamber 19 while the piston 18 moves to the left creates a suction which draws the hydraulic fluid medium into the chamber 19 to maintain the latter filled. Thus, during the time that the auxiliary hydraulic device 80 operates fluid flows through the conduit 10 back to the reservoir 4 and the pressure relief valve 11 maintains upstream of this pressure relief valve a pressure in the conduit 10 which is suitable for the operation of the fluid drive 15, as was described above, so that during the time that the auxiliary hydraulic device 80 is operated there is absolutely no influence on the operation of the fluid drive of the vehicle. Downstream of valve 11 the pressure in the conduit 10 is $P_0$.

Figure 4:
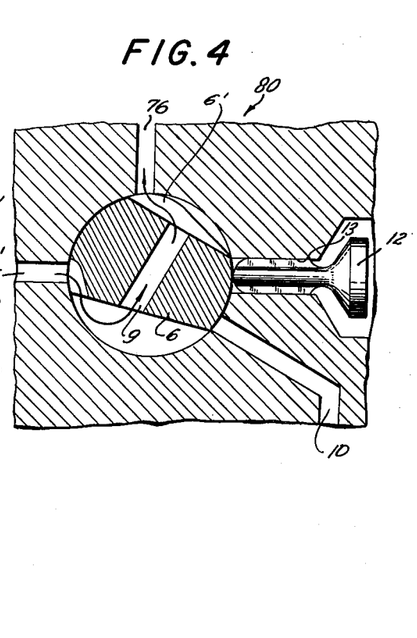

By further turning of the valve 6 in a counterclockwise direction beyond the position of FIG. 3 to that of FIG. 4, the high pressure conduit 5 is placed in communication with a fluid motor 8 through a conduit 76, the communication between return flow conduit 10 and pressure conduit 5 being cut off at this time and also the passage 13 leading to the cylinder 7 is closed at this time by the valve 6. The fluid motor 8 is of a known construction and may be used, for example, for driving a harvester carried by the tractor or the like, and the fluid discharges from the motor 8 through the conduit 77 back to the return flow conduit 10, so that while the valve 6 is in the position of FIG. 4 the pressure relief valve 11 still maintains in the conduit 10 the necessary pressure for proper operation of the fluid drive 15.

In order to prevent any undesirable variations in the pressure of the fluid in the conduit 14 during the very short period of time that the valve 6 is being turned from one of its positions to another of its positions, the return flow conduit 10 communicates through a conduit 16 with a known pressure accumulating device 17, as shown diagrammatically in FIG. 1, this device being maintained under pressure during normal operation of the apparatus and releasing its pressure to the conduit 10 automatically only during those times when the pressure in the conduit 10 tends to diminish undesirably, such times being of only extremely short duration and occurring only, if at all, while the valve 6 is turned between its several positions.

Figure 5:
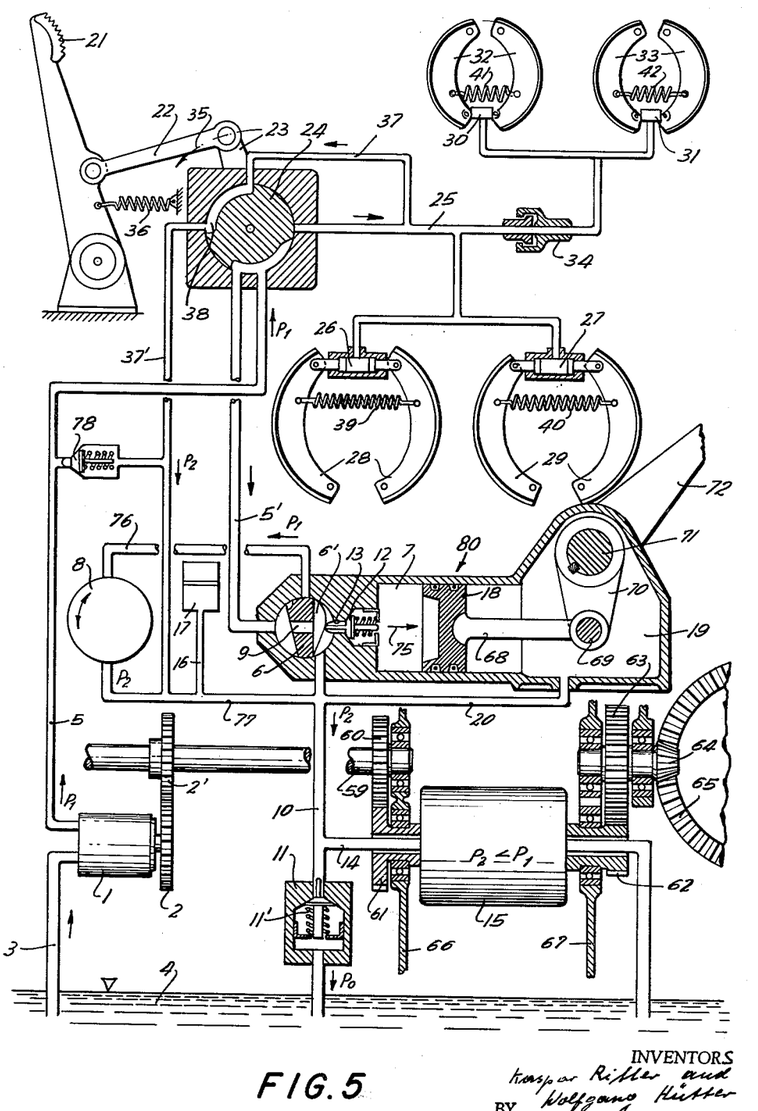
FIG. 5 shows the installation of FIG. 1 with a hydraulic braking structure included therein.
Figure 6:
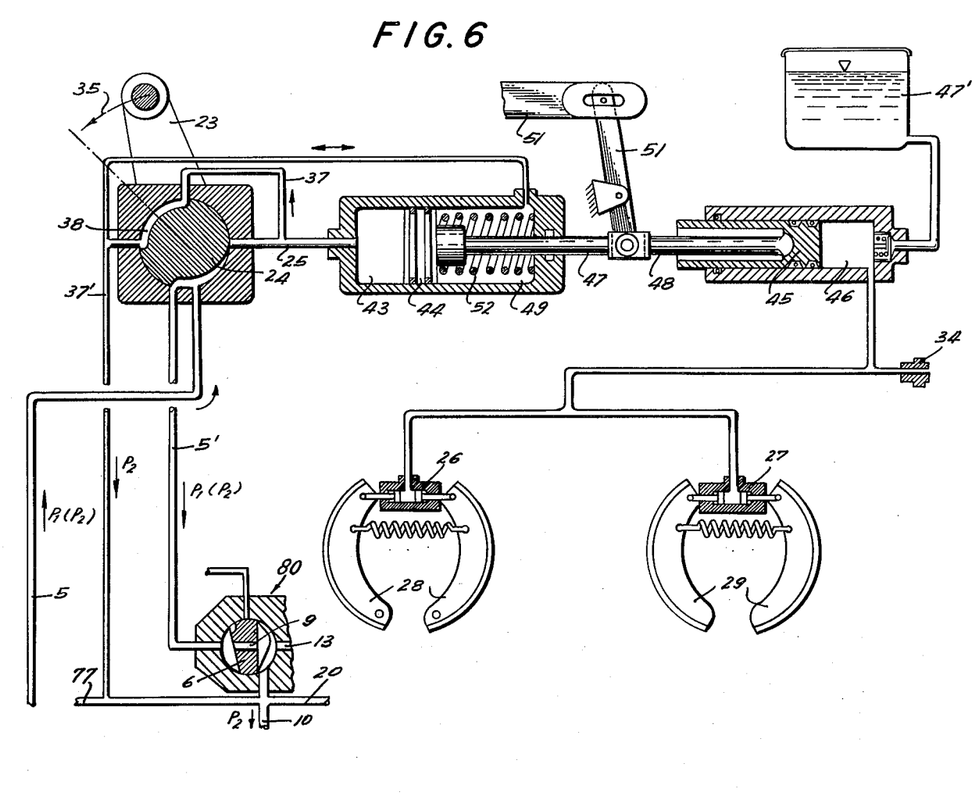
FIG. 6 shows another embodiment of a hydraulic braking structure which may be substituted for the hydraulic braking structure of FIG. 5.
Figure 7:
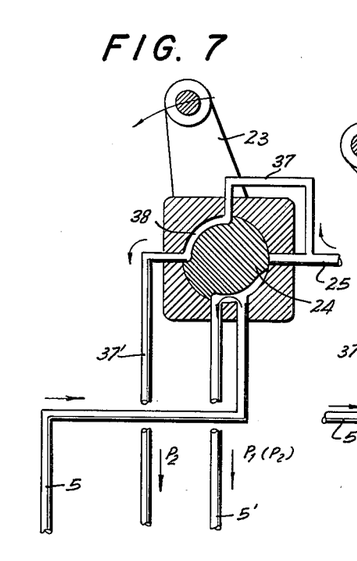
FIG. 7 shows a control valve for the hydraulic braking device of FIG. 5 or 6 in a position where the brakes are released.
Figure 8:
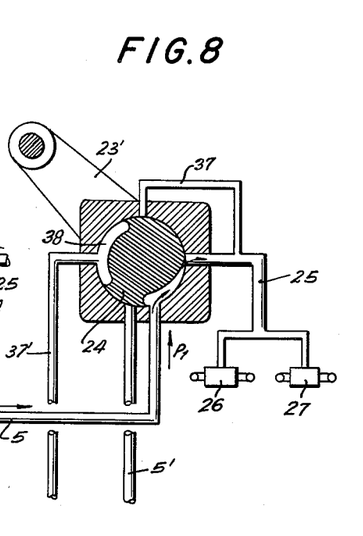
FIG. 8 shows the position which the structure of FIG. 7 takes when the brakes are engaged.

The embodiments of FIGS. 5–9 differ from that of FIGS. 1–4 in that they include in the hydraulic installation in addition to the structure of FIGS. 1–4 a suitable braking means for braking the vehicle and any trailers connected thereto. In the embodiment of FIGS. 5, 7 and 8, the control for the brakes is in the form of a foot pedal 21 supported for turning movement about an axis which is stationary with respect to the vehicle and connected through a linkage 22, 23 with a control valve 24 which is located in the pressure conduit leading to the valve 6, this pressure conduit now being shown as divided into a first portion 5 leading from the pump 1 to the valve 24 and a second portion 5' leading from the valve 24 to the valve 6. In the rest position of the valve 24, which is to say the position of the valve when the brakes are released, the valve 24 places the pressure conduit portions 5 and 5' in communication with each other so that the operation of the entire installation remains the same as described above in connection with FIGS. 1–4.

The valve 24 is turnable within its valve housing and is connected at the exterior of the valve housing with the lever 23 which in turn is pivotally connected to one end of a connecting rod 22 whose opposite end is pivotally connected to the foot pedal 21 which is urged by the spring 36 to a rest position determined by a suitable stop (not shown). When the operator actuates the pedal 21 so as to turn the valve 24 in the direction of arrow 35 shown in FIGS. 5 and 6, the valve 24 assumes the position shown in FIG. 8 in which the lever 23 has assumed a position 23'. In this position of the valve 24 communication between pressure conduit portions 5 and 5' is cut off and the pressure fluid no longer flows to the valve 6. At this time the pressure conduit 5 is placed by the valve 24 in communication with a conduit 25 leading to the hydraulic brake structure shown in FIG. 5.

In the embodiment which is illustrated in FIG. 5 the brake cylinders 26 and 27 of the tractor brakes 28 and 29, respectively, receive the hydraulic fluid under pressure directly from the valve 24 when the latter is in the position of FIG. 8. Also, the fluid under pressure flows to the brake cylinders 30 and 31 of the brakes 32 and 33, respectively, of the wheels of a trailer connected to the tractor, and a releasable conduit connection 34 is provided in order to connect the fluid line of the trailer to the fluid line of the tractor. Thus, when the operator turns the foot pedal 21 from the position of FIG. 5 to that of FIG. 8 the brakes of the tractor and trailer will become engaged. The illustrated brakes 28, 29, 32, and 33 press against unillustrated brake drums. When the operator releases the foot pedal 21, the spring 36 returns the foot pedal to its rest position and the valve 24 turns in a direction opposite to the arrow 35 back to the position of FIG. 5. At this time the relatively strong return springs 39, 40, 41, and 42 respectively engage the brakes so as to force the hydraulic liquid out of the brake cylinders, and this liquid flows through the conduit 37 and from the latter through the valve 24 to the conduit 37', and this latter conduit communicates through a conduit 77 with the return flow conduit 10. The portion 38 of the valve 24 places the conduits 37 and 37' in communication with each other when the valve 24 is in the rest position shown in FIG. 5. The springs 39-42 are capable of returning the brakes to their rest position against the force of the fluid in return flow conduit 10 which is determined by the pressure relief valve 11.

The embodiment of the invention which is illustrated in FIG. 6 includes a brake means formed in part by a high pressure cylinder 43 which communicates through the conduit 25 with the valve 24 so that when the brake pedal is actuated by the operator to turn the lever 23 in the direction of arrow 35 in order to cut off communication between conduits 5 and 5', the fluid under pressure will flow through the conduit 25 into the high pressure cylinder 43 in order to displace the piston 44 thereof to the right, as viewed in FIG. 6. A pair of rods 47 and 48 are fixed axially to each other and respectively cooperate with the pistons 44 and 45 as by being connected thereto so that the pistons 44 and 45 move together along their common axis. The piston 45 is slidable within a main brake cylinder 46 which is supplied with hydraulic fluid from the reservoir 47' and which communicates through suitable conduits with the brake cylinders 26 and 27 which actuate the brakes 28 and 29, respectively, as described above. There is shown at the right part of FIG. 6 a non-return valve at the connection between the cylinder 46 and the conduit leading from the reservoir 47' for preventing fluid in the cylinder 46 from being forced back into the reservoir 47'. Of course, this brake installation may be connected by a releasable connecting device 34 to a trailer. It will be seen that with the embodiment of FIG. 6 the entire brake means except cylinder 43 has its own fluid circuit which is completely cut off from the fluid circuit which includes the valve 24. Thus, it is possible to provide in the two fluid circuits different pressure liquids which are particularly adapted for the particular requirements with respect to lubrication, resistance to cold, etc. of the different circuits. The return flow conduit 37 for the pressure fluid is placed through the cutout 38 of the valve 24 in communication with the return flow conduit 37' when the valve 24 is in the rest position thereof shown in FIG. 6. However, when the brake pedal is actuated the valve 24 turns so as to cut off communication between the conduit portions 37 and 37'. However, the chamber 49 of the high pressure cylinder 43 is then located to the right of the piston 44 thereof and is still in communication with the return flow conduit 37', as indicated in FIG. 6. Thus, there is always in the chamber 49 a pressure determined by the pressure relief valve 11 in the return flow conduit 10.

A manually operable linkage 51 is pivotally connected with the connecting rod means 47, 48 of the pistons 44 and 45, so that through the linkage 51 it is possible to manually shift the piston 45. In this way, even when the engine of the vehicle is idle so that the pump 1 does not operate it is possible for the operator to manually actuate the brakes.

A coil spring 52 surrounds the rod portion 47 within the chamber 49 and acts to urge the piston 44 to the left, as viewed in FIG. 6, this spring 52 serving to counteract the pressure of the liquid in the chamber 43 while the valve 24 is in the rest position thereof shown in FIG. 6, and also the spring 52 serves to overcome the friction of the piston when the brakes are released.

Figure 10:
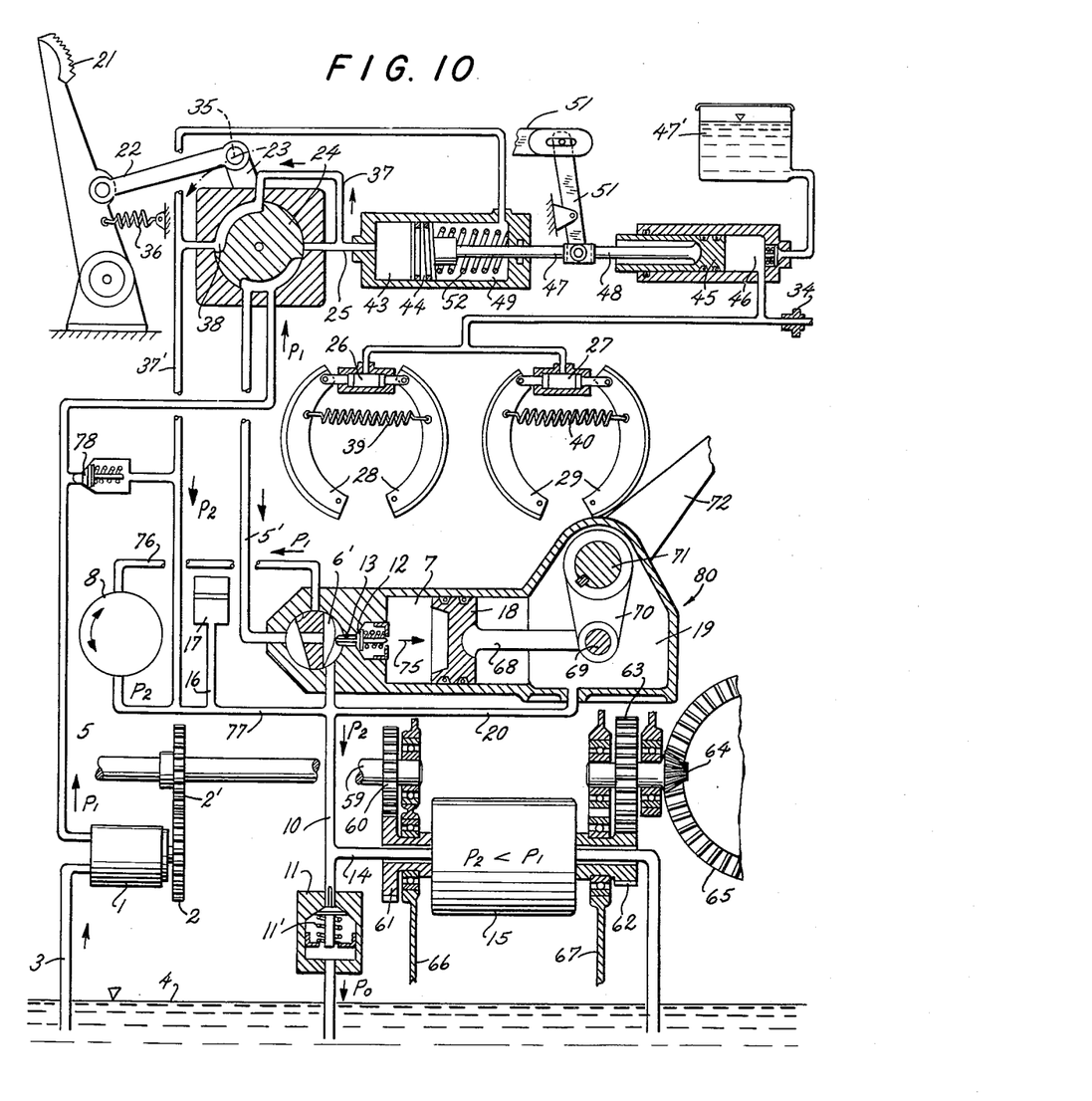
FIG. 10 shows the organization with the hydraulic braking structure of FIG. 6 substituted for the hydraulic braking structure of FIG. 5.

FIG. 10 illustrates the structure of FIG. 6 substituted for the corresponding braking structure of FIG. 5.

Figure 9:
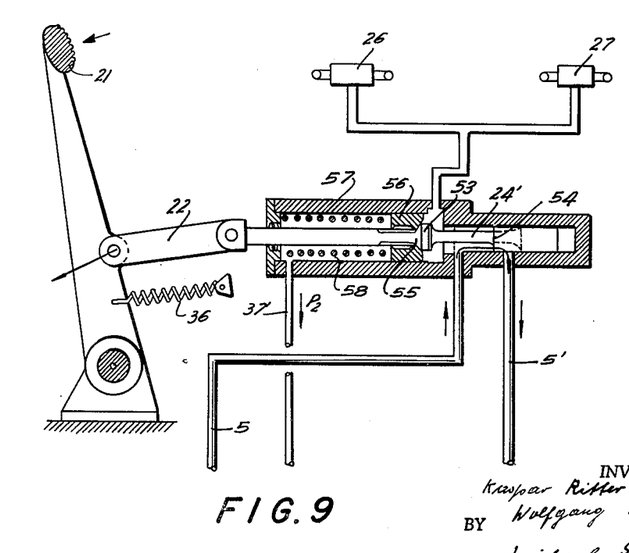
FIG. 9 illustrates a further embodiment of a hydraulic braking arrangement which may be included with the installation of FIG. 1 in place of the hydraulic braking structure shown in FIG. 5.

In the embodiment of the invention which is illustrated in FIG. 9, the valve 24 is replaced by an elongated valve member 24' which is longitudinally shiftable in a suitable valve housing 57, the link 22 being pivotally connected to the foot pedal 21 and to a free end of the longitudinally shiftable valve member 24', as indicated in FIG. 9. The valve 24' is illustrated in FIG. 9 in the position in which the brakes are engaged, and in this position the right-hand control edge 54 of the valve 24' was shifted to the left of the top end of the conduit portion 5' so as to seal the latter from the pressure conduit portion 5. The fluid freely flows from the latter to the brake cylinders 26 and 27, or where a separate brake fluid circuit is provided, as described above in connection with FIG. 6, the fluid from the conduit 5 flows to a high pressure cylinder such as the cylinder 43 of FIG. 6. The valve 24' has an outwardly extending left-hand annular flange 53 which controls the conduit 5 so as to uncover the latter when the valve is in the position shown in FIG. 9 to provide a free path for the fluid to the brake installation. The valve 24' is surrounded just to the left of the control flange 53, as viewed in FIG. 9, by a ring 56 which engages the portion 55 of the valve 24' which portion forms the control flange 53. This ring 56 acts as a pressure relief valve between the pressure conduit 5 and the return flow conduit 37' and slides within the cylinder 57. A spring 58 is coiled about the portion of valve 24' located in cylinder 57 and presses against the ring 56 so as to urge the latter to the right, as viewed in FIG. 9, and it is apparent that the more the operator turns the brake pedal 21 against the force of spring 36 in a counterclockwise direction, as viewed in FIG. 9, the more the ring 56 will be displaced to the left, as viewed in FIG. 9, and the more the spring 58 will be compressed, so that the pressure at which the relief valve will open continuously increases proportionally with the extent to which the brake pedal is moved by the operator. The spring 58 is so designed that when the valve 24' is in its right-hand end position, as viewed in FIG. 9, which is to say that it is in its rest position, the spring 58 is under no compression or under very small compression so that the relief valve can open easily and thus the fluid can flow easily from the brake cylinders back to the reservoir. Thus, as the progressively depressed pedal 21 increases the compression of the spring and thus the pressure in the brake cylinders increases so that the braking force increases, and thus with this control arrangement it is possible to provide an extremely fine adjustment of the braking force.

Instead of an adjustable pressure relief valve which is automatically adjusted in dependency upon the extent of movement of the brake pedal, it is possible to provide, as shown in FIG. 5, a pressure relief valve 78 which is placed in communication with conduits 5 and 37' in parallel with the valve 24. This pressure relief valve 78 is set at the highest permissible pressure of the pump 1. Thus, the pressure relief valve 78 prevents the generation of undesirably large pressures in the pressure conduit 5 during actuation of the brakes. During actuation of the brakes only a relatively small amount of fluid flows through the valve 24 and the conduit 25 to the brakes.

It will be understood that each of the elements described above, or two or more together, may also find a useful application in other types of hydraulic installations differing from the types described above.

While the invention has been illustrated and described as embodied in hydraulic installations for tractors or the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this inveention and, therefore, such adaptations should and are intended to be comprehended within the meaning and range of equivalence of the following claims.

What is claimed as new and desired to be secured by Letters Patent is:

1. In a hydraulic installation for vehicles such as tractors and the like, in combination, drive means; pressure pump means driven by said drive means for pumping liquid at a relatively high pressure; a hydraulic auxiliary device requiring a relatively high liquid pressure communicating with said pump means to receive liquid therefrom; a return flow conduit communicating with said auxiliary device for returning liquid therefrom to a reservoir from which liquid is withdrawn by said pump means; a hydrostatic transmission driven by said drive means for driving the vehicle, said hydrostatic transmission communicating with said return flow conduit to receive therefrom liquid to replace liquid escaping from said hydrostatic transmission; and means cooperating with said return flow conduit downstream of the place where said hydrostatic transmission communicates with said return flow conduit for maintaining the liquid in the latter at a pressure substantially lower than said high pressure but great enough to replace liquid escaping from said hydrostatic transmission.

2. In a hydraulic installation for vehicles such as tractors or the like, in combination, drive means; pressure pump means for pumping liquid at a relative high pressure; a hydraulic auxiliary device requiring a relatively high liquid pressure; a supply conduit leading from said pump means to said auxiliary device for providing the latter with liquid under pressure delivered from said pump means; a return flow conduit communicating with said auxiliary device for returning liquid therefrom to a reservoir from which liquid is withdrawn by said pump means; a hydrostatic transmission driven by said drive means for driving the vehicle, said hydrostatic transmission communicating with said return flow conduit to receive therefrom liquid to replace liquid escaping from said hydrostatic transmission; and a pressure relief valve located in each of said conduits for maintaining the liquid pressure in said return flow conduit above a predetermined minimum value and for maintaining the liquid pressure in said supply conduit below a predetermined maximum value, the pressure relief valve in said return flow conduit being located downstream of the place at which said hydrostatic transmission communicates therewith for maintaining upstream of the latter pressure relief valve a liquid pressure substantially less than said high pressure but sufficient to replace liquid escaping from said hydrostatic transmission.

3. In a hydraulic installation for vehicles such as tractors and the like, in combination, drive means; pressure pump means driven by said drive means for pumping liquid at a relatively high pressure; a hydraulic auxiliary device requiring a relatively high liquid pressure communicating with said pump means to receive liquid therefrom; a return flow conduit communicating with said auxiliary device for returning liquid therefrom to a reservoir from which liquid is withdrawn by said pump means; a fluid drive driven by said drive means for driving the vehicle, said fluid drive communicating with said return flow conduit to receive therefrom liquid to replace liquid which escapes from said fluid drive; a pressure relief valve in said return flow conduit downstream of the place at which said fluid drive communicates therewith for maintaining upstream of said pressure relief valve a liquid pressure substantially lower than said high pressure but sufficient to replace liquid escaping from said fluid drive; and pressure accumulating means communicating with said return flow conduit upstream of the place at which said fluid drive communicates with the return flow conduit.

4. In a hydraulic installation for vehicles such as tractors and the like, in combination, drive means; pressure pump means driven by said drive means for pumping liquid at a relatively high pressure; a hydraulic auxiliary device requiring a relatively high liquid pressure and including a cylinder and piston slidable therein, said cylinder communicating at one side of said piston with said pump means to receive liquid therefrom for operating the auxiliary device; a return flow conduit communicating with said cylinder at said one side of said piston therein for returning liquid therefrom to a reservoir from which liquid is withdrawn by said pump means; a conduit providing communication between said cylinder at the other side of said piston therein and said return flow conduit so that when the volume of said cylinder on said other side of said piston decreases hydraulic fluid will flow from said cylinder at said other side of said piston to said return flow conduit; a fluid drive driven by said drive means for driving the vehicle, said fluid drive communicating with said return flow conduit to receive therefrom liquid to replace liquid escaping from said fluid drive; and means cooperating with said return flow conduit downstream of the place where said fluid drive communicates with said conduit for maintaining the liquid in the latter at a pressure substantially lower than said high pressure but great enough to replace liquid escaping from said fluid drive.

5. In a hydraulic installation for vehicles such as tractors and the like, in combination, drive means; pressure pump means driven by said drive means for pumping liquid at a relative high pressure; a hydraulic auxiliary device requiring a relative high liquid pressure; supply conduit means leading from said pump means to said auxiliary device for providing the latter with liquid under pressure delivered by said pump means; a return flow conduit communicating with said auxiliary device for returning liquid therefrom to a reservoir from which liquid is withdrawn by said pump means; a hydrostatic transmission driven by said drive means for driving the vehicle, said hydrostatic transmission communicating with said return flow conduit to receive therefrom liquid to replace liquid escaping from said hydrostatic transmission; means cooperating with said return flow conduit downstream of the place where said hydrostatic transmission communicates with said return flow conduit for maintaining the liquid in the latter at a pressure substantially lower than said high pressure but great enough to replace liquid escaping from said hydrostatic transmission; brake means for braking the vehicle; and hydraulic control means capable of being operated by the operator of the vehicle and operatively connected to said brake means for controlling the latter, said hydraulic control means inserted in said supply conduit means between said pressure pump means and said auxiliary device.

6. In a hydraulic installation for vehicles as recited in claim 1, a main brake cylinder having a piston slidable therein; a plurality of auxiliary brake cylinders; a closed hydraulic circuit including said main and auxiliary brake cylinders; a high pressure cylinder having a piston slidable therein and communicating at one side of said piston with said pressure pump means; means interconnecting said pistons of said high pressure cylinder and said main brake cylinder for causing said pistons to shift together in their respective cylinders; and hydraulic control means capable of being actuated by the operator of the vehicle and located in the line of communication between said high pressure cylinder and said pump means for controlling the flow of hydraulic liquid to and from said high pressure cylinder, said hydraulic control means inserted in the line of communication between said pump means and said auxiliary device.

7. In a hydraulic installation for vehicles as recited in claim 1, brakes for braking the vehicle; a main brake cylinder having a piston slidable therein; a plurality of auxiliary brake cylinders cooperating with said brakes; a closed hydraulic circuit including said main and auxiliary brake cylinders; a high pressure cylinder having a piston slidable therein and communicating at one side of said piston with said pressure pump means; means interconnecting said pistons of said high pressure cylinder and said main brake cylinder for causing said pistons to shift together in their respective cylinder; hydraulic control means capable of being actuated by the operator of the vehicle and located in the line of communication between said high pressure cylinder and said pump means for controlling the flow of hydraulic liquid to and from said high pressure cylinder, said hydraulic control means inserted in the line of communication between said pump means and said auxiliary device; and manually operable mechanical means operatively connected with said pistons of said main brake cylinder for manually actuating said piston to manually control the brakes independently of the hydraulic operation thereof.

8. In a hydraulic installation for vehicles such as tractors and the like, in combination, pressure pump means for pumping liquid at a relatively high pressure; a hydraulic auxiliary device requiring a relatively high liquid pressure; a pressure conduit leading from said pump means to said auxiliary device for providing the latter with liquid at relatively high pressure; a return flow conduit communicating with said auxiliary device for returning liquid therefrom to a reservoir from which liquid is withdrawn by said pump means; hydraulic brake means for braking the vehicle; valve means capable of being actuated by the operator and located in said pressure conduit ahead of said auxiliary device, said valve means cooperating with said hydraulic brake means for controlling the latter and said valve means having a brake operating position providing a flow of high pressure liquid from said pump means through part of said pressure conduit to said brake means and cutting off the flow of hydraulic liquid at relatively high pressure from said pump means to said auxiliary device; a fluid drive for driving the vehicle, said fluid drive communicating with said return flow conduit to receive liquid therefrom; and means in said return flow conduit and downstream from the location where said fluid drive communicates with said return flow conduit for maintaining the liquid in the latter at a pressure great enough for proper operation of the fluid drive.

9. In a hydraulic installation for vehicles such as tractors and the like, in combination, drive means; pressure pump means driven by said drive means for pumping liquid at a relatively high pressure; a hydraulic auxiliary device requiring a relatively high liquid pressure; supply conduit means leading from said pump means to said auxiliary device for providing the latter with liquid under pressure delivered by said pump means; a return flow conduit communicating with said auxiliary device for returning liquid therefrom to a reservoir from which liquid is withdrawn by said pump means; a hydrostatic transmission driven by said drive means for driving the vehicle, said hydrostatic transmission communicating with said return flow conduit to receive therefrom liquid to replace liquid escaping from said hydrostatic transmission; means cooperating with said return flow conduit downstream from the place where said hydrostatic transmission communicates with said return flow conduit for maintaining the liquid in the latter at a pressure substantially lower than said high pressure but great enough to replace liquid escaping from said hydrostatic transmission; hydraulic brake means for braking the vehicle; valve means located in said supply conduit means between said auxiliary device and said pump means; a brake operating member controlling said valve means and capable of being actuated by the operator of the vehicle; said valve means operatively connected to said hydraulic brake means for controlling the latter and said valve means having a brake operating position providing a flow of high pressure liquid from said pump means through part of said supply conduit means to said brake means and cutting off the flow of hydraulic liquid at relatively high pressure from said pump means to said auxiliary device; and pressure relief valve means located in said supply conduit means between said pump means and first-mentioned valve means and communicating with said return flow conduit for automatically limiting the pressure of the fluid delivered to said brake means, the pressure at which said pressure relief valve means will automatically open being directly proportional with the extent to which said brake operating member is moved by the operator.

References Cited in the file of this patent

UNITED STATES PATENTS

| | | |
|---|---|---|
| 1,982,711 | Vickers | Dec. 4, 1934 |
| 2,126,849 | Weiss | Aug. 16, 1938 |
| 2,194,197 | Millican et al. | Mar. 19, 1940 |
| 2,363,977 | Kucher | Nov. 28, 1944 |
| 2,464,039 | Howell | Mar. 8, 1949 |
| 2,651,179 | Blood | Sept. 8, 1953 |
| 2,807,935 | Lapsley | Oct. 1, 1957 |
| 2,829,724 | Burns et al. | Apr. 8, 1958 |
| 2,878,646 | Edge et al. | Mar. 24, 1959 |
| 2,895,151 | Link | July 21, 1959 |
| 2,953,212 | Lee | Sept. 20, 1960 |